June 30, 1925.
J. LEDWINKA
1,543,858
DETACHABLE UPHOLSTERY
Filed June 11, 1920
2 Sheets-Sheet 1
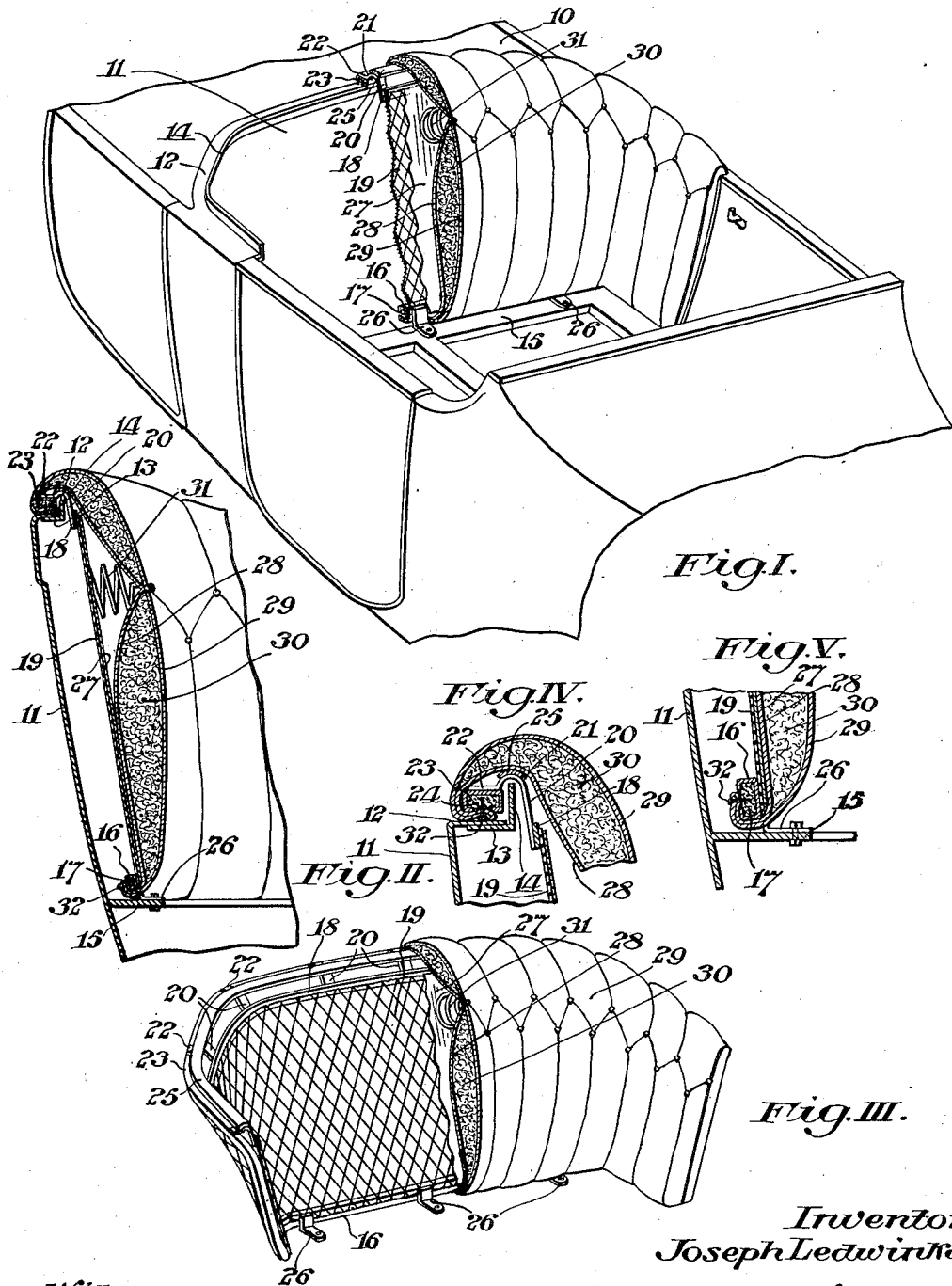
Witness:
R. H. Schleicher
Inventor:
Joseph Ledwinka,
By C. R. Desjardins
Attorney June 30, 1925.
J. LEDWINKA
DETACHABLE UPHOLSTERY
Filed June 11, 1920
1,543,858
2 Sheets-Sheet 2
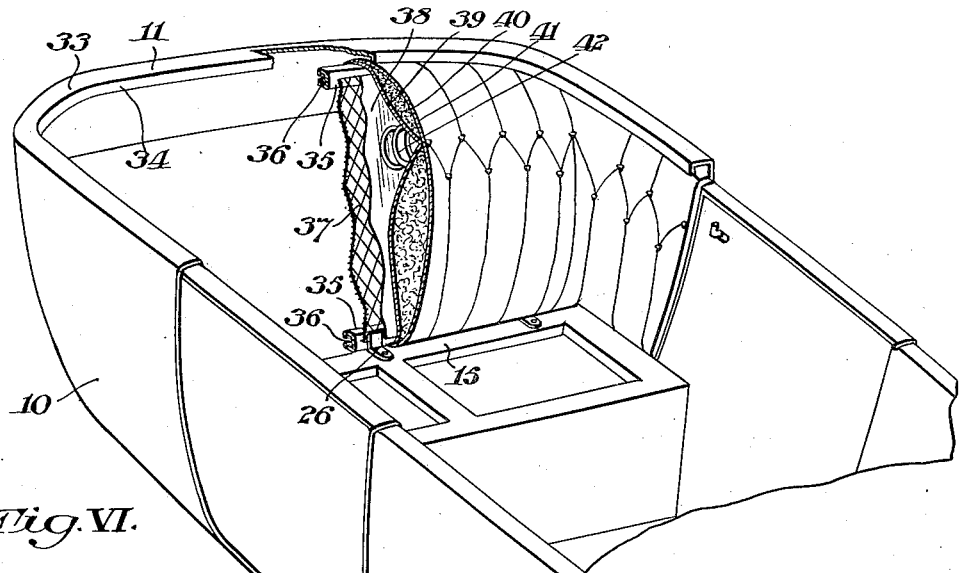
Fig. VI.
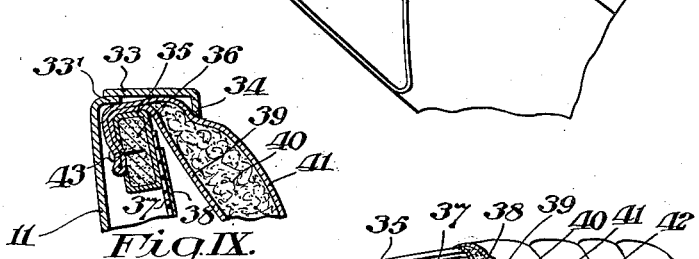
Fig. IX.
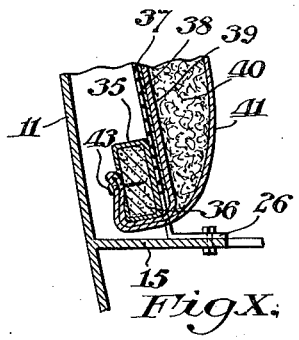
Fig. X.
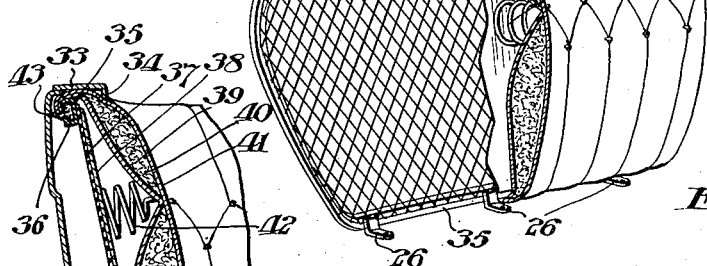
Fig. VIII.
Fig. VII.
Witness:
R. H. Schleicher
Inventor:
Joseph Ledwinka,
By C. B. Desjardins
Attorney Patented June 30, 1925.

1,543,858

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

DETACHABLE UPHOLSTERY.

Application filed June 11, 1920. Serial No. 388,147.

*To all whom it may concern:*

Be it known that I, JOSEPH LEDWINKA, residing at Philadelphia, county of Philadelphia, State of Pennsylvania, have invented certain new and useful Improvements in Detachable Upholstery, of which I declare the following to be a full, clear, and exact description.

My invention relates to improvements in detachable upholstery and, more particularly, to the construction of detachable upholstery units and their application to motor vehicles.

The principal object of my invention is to provide a detachable upholstery unit which may be removably and detachably mounted on the seat back portion of an automobile and firmly maintained in such position, which unit is so constructed as to be sightly in appearance and to permit of the ready application and attachment of the upholstery material to the frame of the unit in such a manner that it will not pull or tear loose easily from its points of attachment to the frame.

Further objects, and objects relating to economies of material and details of construction, will definitely appear from the detailed description to follow. I accomplish the objects of my invention by the devices and means described in the following specifications. My invention is clearly defined and set forth in the appended claims.

Structures constituting preferred embodiments of my invention are illustrated in the accompanying drawings, forming a part of this specification in which:—

Fig. I. is a fragmentary, perspective view of a motor vehicle, showing a front seat having mounted thereon an upholstery unit constructed in accordance with my invention, said unit being partly broken away to show the manner in which it is mounted.

Fig. II. is a transverse, sectional view through the seat back portion of the automobile body and upholstery unit mounted thereon.

Fig. III. is a perspective view of the upholstery unit removed from the seat back and with the upholstery partly broken away to show the frame on which it is mounted.

Fig. IV. is an enlarged, detail, sectional view, corresponding to the upper part of Fig. II.

Fig. V. is an enlarged, detail, sectional view, corresponding to the lower part of Fig. II.

Fig. VI. is a fragmentary, perspective view of a motor vehicle body, showing the rear seat portion and a modified form of upholstery unit applied thereto.

Fig. VII. is a transverse, sectional view through the seat back portion and the upholstery unit shown in Fig. VI.

Fig. VIII. is a perspective view of the detachable upholstery unit shown in Fig. VI., with the upholstery partly broken away to show the frame.

Fig. IX. is a detail, enlarged, sectional view, corresponding to the upper part of Fig. VII.

Fig. X. is a detail, enlarged, sectional view, corresponding to the lower part of Fig. VII.

In the drawings, similar reference numerals refer to similar parts throughout the several views.

In general, I accomplish the objects of my invention by providing a detachable upholstery unit including a frame having a marginal channel, in which a tacking strip is mounted, to which frame the upholstery is applied, the margins of the upholstery being tacked to the tacking strip, and the channel being so arranged with reference to the frame that the upholstery is drawn over a side of the channel extending at right angles to the tacking surface of the tacking strip. The upholstery unit so constructed is applied to the seat back portion of the motor vehicle body in such a way that the upper portion of the frame is maintained seated against a horizontal shoulder at the upper edge of the seat back portion.

In Figs. I. to V. inclusive, I have shown one embodiment of my invention, comprising a single, detachable, upholstery unit curved to conform to the longitudinal curvature of the seat back portion and mounted thereon, such unit furnishing the upholstery for both the seat back and sides. Referring to the numbered parts of the drawing, I have shown a motor vehicle body, 10, provided with a front seat-back portion, 11, curved longitudinally in the usual manner to provide the back and sides for the seats. The upper edge of this seat-back portion is turned laterally to provide the inwardly extending horizontal flange, 12. An angle strip is applied to said flange, comprising the flange, 13, which is welded, or otherwise secured to the flange, 12, and the vertically extending flange, 14. The usual seat-pan or seat-support, 15, is provided. The frame of the upholstery unit comprises a channel, 16, at the lower edge of the frame, which channel, at its ends, is bent forwardly and then extends vertically to form the side portions of the upholstery frame, as shown in Fig. III. This channel, 16, presents or opens rearwardly, that is, away from the face of the frame to which the upholstery is to be applied. The channel, 16, carries therein fibrous material, 17, of any suitable nature, to form a tacking strip and receive the tacks by which the upholstery is applied. A bar, 18, is secured at its ends to the upper ends of the vertical portions of the channel, 16, and said bar is curved to correspond to the longitudinal curvature of the seat back portion as shown in Fig. III. A sheet of reticulated metal, 19, such as wire screen or expanded metal mesh, is fastened at its edges to the base of the channel, 16, and to the bar, 18, said sheet of reticulated metal, 19, forming the body of the frame and being formed to the curvature of the seat-back portion, as shown in Fig. III.

A plurality of hook-shaped straps, 20, are welded at intervals to the bar, 18, and extend upwardly therefrom, each of said straps having a reversely curved portion, 21, and a laterally extending end, 22. A channel, 23, is secured to the ends, 22, of the straps, 20, said channel being curved to conform to the longitudinal curvature of the seat back portion and having its base welded to the ends, 22. So arranged, it constitutes the marginal strength element of the frame. Said channel opens downwardly and carries fibrous material forming the tacking strip, 24. A strip, 25, which is slightly curved in cross-section, extends the length of the frame and is curved to conform to the curvature of the frame, said strip being welded to the curved portions, 21, of the straps, 20. This strip, 25, serves to bind the straps together and to give rigidity to this portion of the frame, and, at the same time, gives a smooth appearance to the upholstery unit when the upholstery is drawn over this strip, as will be described hereinafter.

Angle brackets, 26, are fastened to the base of the channel, 16, at the lower portion of the frame, by means of which brackets the frame is attached to the seat support, 15, as shown in Fig. I. A sheet of fabric, 27, may cover the metal sheet, 19, of the frame and the upholstery is applied to the frame as shown in Figs. I and II. The upholstery comprises the back sheet, 28, and the sheet of upholstery material, 29, such as leather or artificial leather, suitable filling material, 30, being interposed between the back sheet and the sheet of upholstery material, in the usual manner. If desired, springs, 31, may be interposed between the body of the frame and the back sheet, 28.

The edge portions of the upholstery, that is, of the back sheet, 28, and the sheet of upholstery material, 29, are drawn over the outer side of the channel, 16, and then fastened to the tacking strip, 17, by the tacks, 32. At the upper portion of the frame, the upholstery material is drawn over the curved strip, 25, and the outer side of the channel, 23, and then tacked to the tacking strip, 24, by means of tacks, 32. This unit is applied to the seat-back portion by seating the channel, 23, on the horizontal flange, 12, behind the vertical flange, 14. The lower portion of the frame is then fastened to the seat support, 15, by means of the angle brackets, 26.

It will be seen that the upper margins of the upholstery material are interposed between channel, 23, and the flange, 12, and form a sort of washer between these metal parts, thus tending to yieldingly seat the upper portion of the frame and to prevent noises. The hook-shaped straps, 20, and the upholstery overhang the flange, 14, the upholstery being drawn around the outer side of the channel, 23, and over strip, 25. This gives the upholstery a finished appearance, which conforms to the curvature of the upper portion of the frame, and it will be seen that, when the unit is mounted in place, the edges of the upholstery material are hidden. The springs, which are usually used in such upholstery units, exert a tension on the upholstery material, which would tend to draw it loose from the fastening tacks, 32, if it were not for the fact that the channel is so disposed that the upholstery material is drawn around one side of the channel and the tacks are driven into a surface extending at right angles to said side. The pull of the springs is, therefore, taken largely by the side of the channel instead of by the tacks.

In Figs. VI. to X. inclusive, I have shown another embodiment of my invention. Referring to the numbered parts of these views, I have shown a motor vehicle body, 10, having a seat-back portion, 11, with a laterally extending horizontal flange, 33', at the upper edge thereof, to which a strip, 33, having a downwardly extending flange, 34, at its forward edge, is welded. The usual seat-pan or seat-support, 15, is provided. In this embodiment of my invention, I provide three upholstery units, one for the seat back and one for each of the side portions of the seat. I have shown the seat-back portion in detail, but the construction of the units for the side portions is identical, except for the shape.

The frame comprises a marginal channel, 35, to the base of which a sheet of reticulated metal, 37, such as metal screen or expanded metal mesh is fastened by welding or otherwise. The channel, 35, faces rearwardly, that is, away from the surface to which the upholstery is applied, and the channel carries fibrous material, such as paste board or similar material, forming a tacking strip, 36. A sheet of fabric, 38, may be placed in front of the sheet of metal, 37, and the upholstery comprising the back sheet, 39, the filling, 40, and the sheet of upholstery material, 41, such as leather or artificial leather, is applied to the front of the frame, with its marginal edges drawn over the outer side of the channel, 35, and tacked to the tacking strip, 36, by the tacks, 43. If desired, springs, 42, may be interposed between the sheet of metal, 37, and the upholstery, in the usual manner. The unit is applied to the seat back portion by inserting the upper edge beneath the flange, 33. The downwardly extending flange, 34, engages in front of the upper edge of the upholstery unit and the unit is held in position by the angular brackets, 26, which are welded to the base of the channel, 35, and secured in any suitable manner to the seat support, 15.

It will be seen that, in this embodiment, as well as in the embodiment shown in Figs. I. to V., the upholstery unit has a marginal channel so located and positioned with reference to the frame, that the margins of the upholstery material are drawn over the outer side of the channel, and then tacked in a tacking strip, the exposed surface of which extends at right angles to the side of the channel. This results in a smoothly finished appearance, in that all of the edges of the upholstery material are concealed when in use, and the pull of the springs, 42, against the upholstery material is taken by the side of the channel and not directly by the tacks, 42, so that the upholstery material will not pull or work loose readily from the tacking strip.

In Figs. I. to V., I have shown a single curved unit, fitting the seat back and side portions and, in Figs. VI. to X. I have shown three units, one for the seat back and two for the side portions. It will be understood that either construction may be made up either as a single curved unit or in one or more sections, as shown in Figs. VI. to X, for instance, in Figs. I. to V., the upholstery might be applied in three sections after the manner of Fig. VI, and such construction would still be within the spirit of my invention.

I am aware that the particular embodiments of my invention, which I have here shown and described, are susceptible of considerable variation without departing from the spirit of my invention, and, therefore, I desire to claim the same broadly, as well as specifically, as indicated by the appended claims.

Having thus described my invention, what I claim as new and desire to secure by Letters Patent is:

1. The combination with an automobile body having a seat back portion, of a detachable and removable upholstery unit, comprising a rearwardly-presenting channel having vertically extending portions at the ends thereof, a bar connecting the upper ends of said vertical portions, a sheet of reticulated metal secured at its margins to said channel and said bar, a plurality of hook-shaped straps secured to said bar, a downwardly-presenting channel fastened to the ends of said straps, a tacking strip mounted in each of said channels, upholstery applied to the front of said sheet and having its edges secured to said tacking strip, and means for detachably mounting said unit on said seat back portion.

2. The combination with an automobile body having a seat back portion and a longitudinally extending shoulder at the upper edge thereof, of a detachable and removable upholstery unit, comprising a frame and a bar secured at the upper edge thereof, a plurality of hook-shaped straps fastened to said bar and extending rearwardly from said frame, a channel secured to the free ends of said straps, a tacking strip mounted in said channel, a curved longitudinally extending strip fastened to the upper portions of said straps, upholstery applied to said frame and having its upper portion drawn over one side of said channel and said longitudinally extending strip and secured to said tacking strip, and means for detachably mounting said frame on said seat back portion, with said channel seated on said shoulder.

3. The combination with an automobile body having a seat back portion, of a detachable and removable seat-back upholstery unit comprising a frame including a rearwardly-facing marginal channel, and a downwardly-facing channel extending the length of the upper edge of said frame in the rear of the frame and conforming to the upper edge of said seat-back portion, a tacking strip mounted in each channel, upholstery applied to said frame and having its edges secured to said tacking strips, said upholstery being drawn over the outer sides of said channels, and means for detachably mounting said frame on said seat back portion.

4. A removable seat-back upholstery unit for motor vehicles, comprising the combination of a rearwardly-opening channel, a sheet of reticulated metal fastened at its edges to said channel, a downwardly-opening channel carried by the upper edge of said sheet in the rear thereof, a tacking strip mounted in each channel, and upholstery having its edges drawn over the outer sides of the channels and fastened to said tacking strips.

5. A removable seat-back upholstery unit for motor vehicles comprising the combination of a frame, including a rearwardly-opening channel at the sides and lower margin of said frame, a horizontally extending bar at the upper margin of said frame, a sheet of reticulated metal fastened at its margins to said channel and to said bar, a downwardly-opening channel carried by said bar, a tacking strip mounted in each of said channels, and upholstery applied to said frame and having its margins drawn over the outer sides of said channels and fastened to said tacking strips.

6. A removable and detachable seat-back upholstery unit comprising a frame including a rearwardly-opening marginal channel extending along the base and sides of the frame and a downwardly-opening channel carried at the upper edge of said frame in the rear thereof, a tacking strip in each channel, and upholstery applied to said frame and having its margins fastened to said tacking strips.

7. A metallic upholstery supporting frame for removable and detachable upholstery comprising a main body of reticulated metal, hook shaped straps connected with said body and reversely bent, and a channel strip constituting the border strength element of said frame secured to said straps and opening downwardly.

In testimony whereof, I affix my signature.

JOSEPH LEDWINKA.